(12) United States Patent
Shang et al.

(10) Patent No.: US 10,212,893 B2
(45) Date of Patent: Feb. 26, 2019

(54) TRUNK INJECTION NEEDLE

(71) Applicant: NANJING FORESTRY UNIVERSITY, Nanjing, Jiangsu (CN)

(72) Inventors: Qingqing Shang, Jiangsu (CN); Tongming Yin, Jiangsu (CN); Zhiwu Sun, Jiangsu (CN); Yunwei Ju, Jiangsu (CN)

(73) Assignee: NANJING FORESTRY UNIVERSITY, Nanjing, Jiangsu (CN)

( * ) Notice: Subject to any disclaimer, the term of this patent is extended or adjusted under 35 U.S.C. 154(b) by 424 days.

(21) Appl. No.: 15/106,260

(22) PCT Filed: Jul. 8, 2015

(86) PCT No.: PCT/CN2015/083621
§ 371 (c)(1),
(2) Date: Jun. 17, 2016

(87) PCT Pub. No.: WO2015/176691
PCT Pub. Date: Nov. 26, 2015

(65) Prior Publication Data
US 2016/0360709 A1    Dec. 15, 2016

(30) Foreign Application Priority Data
May 23, 2014    (CN) .......................... 2014 1 02236786

(51) Int. Cl.
*A01G 7/06*     (2006.01)
*A01G 23/00*    (2006.01)
*A01G 29/00*    (2006.01)

(52) U.S. Cl.
CPC .............. *A01G 7/06* (2013.01); *A01G 23/00* (2013.01); *A01G 29/00* (2013.01)

(58) Field of Classification Search
CPC .......... A01G 7/06; A01G 23/00; A01G 23/10; A01G 23/12; A01G 23/14; A01G 29/00;
(Continued)

(56) References Cited

U.S. PATENT DOCUMENTS

RE5,175  E  *  12/1872  Post ................................. 47/53
469,232  A  *   2/1892  Currier ................... A01G 23/14
                                                     47/51

(Continued)

OTHER PUBLICATIONS

Qingqing Shang et al. Study on Structure of Needle Head and Seal Mechanism of Tree Trunk Injection. 2011 International Conference on Transportation, Mechanical, and Electrical Engineering, Dec. 16-18, Changchun, China. p. 1319-1322. ISBN: 978-1-4577-1701-7.

(Continued)

*Primary Examiner* — Joshua D Huson
*Assistant Examiner* — Christopher D Hutchens

(57) ABSTRACT

A trunk injection needle includes: a front part which is conical, a middle part which is cylindrical, and a rear part which is cylindrical, which are respectively provided along a needle axis; wherein an outer diameter of the rear part is larger than outer diameters of the front part and the middle part; the front part has a bits guiding hole extending along the needle axis, and the rear part has a drug feeding hole extending along the needle axis; wherein the middle part has two outlet holes extending along a radical direction, and a separating board is provided between the two outlet holes; a rear end of the bits guiding hole communicates with the two outlet holes at two sides of the separating board; and a front end of the drug feeding hole communicates with the two outlet holes.

14 Claims, 3 Drawing Sheets

(58) Field of Classification Search
CPC ... A61M 5/3286; A61M 5/329; A61M 5/3291
USPC ............... 47/10–12, 50–54, 57.5; 222/80, 81
See application file for complete search history.

(56) References Cited

U.S. PATENT DOCUMENTS

| | | | | | |
|---|---|---|---|---|---|
| 509,980 | A | * | 12/1893 | Warner | A01G 23/14 47/53 |
| 606,613 | A | * | 6/1898 | Willis | A01G 23/14 47/53 |
| 633,224 | A | * | 9/1899 | Tebbetts | A01G 23/14 47/51 |
| 1,248,251 | A | * | 11/1917 | Shaw | B67D 3/043 222/509 |
| 1,342,299 | A | * | 6/1920 | Shaw | B67B 7/26 222/478 |
| 3,596,402 | A | * | 8/1971 | Palmer | A01G 23/14 222/81 |
| 3,659,536 | A | * | 5/1972 | White | A01C 23/026 111/7.1 |
| 4,705,218 | A | * | 11/1987 | Daniels | A01G 29/00 111/7.1 |
| 5,951,526 | A | * | 9/1999 | Korisch | A61M 5/3129 604/208 |
| 5,956,894 | A | * | 9/1999 | Eldridge | A01G 7/06 47/57.5 |
| 2004/0079169 | A1 | * | 4/2004 | Wild | A01G 7/06 73/861 |
| 2005/0166450 | A1 | * | 8/2005 | Wild | A01G 7/06 47/57.5 |
| 2016/0081308 | A1 | * | 3/2016 | Cary | A61M 5/1582 222/80 |

OTHER PUBLICATIONS

Qingqing Shang et al. The Study of Motorized Trunk Treatment with Advance and Retreat Injection Needle and Its Clamping Structure. The 2nd International Conference on Mechanic Automation and Control Engineering (MACE 2011), Inner Mongolia, China, Jul. 2011. p. 4616-4619. ISBN: 978-1-4244-9438-5.
Shang; Qingqing et al. Study on a high pressure and large capacity tree trunk injector. Journal of Nanjing Forestry University (Natural Science Edition), vol. 33, No. 5, Sep. 2009, p. 101-104.

* cited by examiner

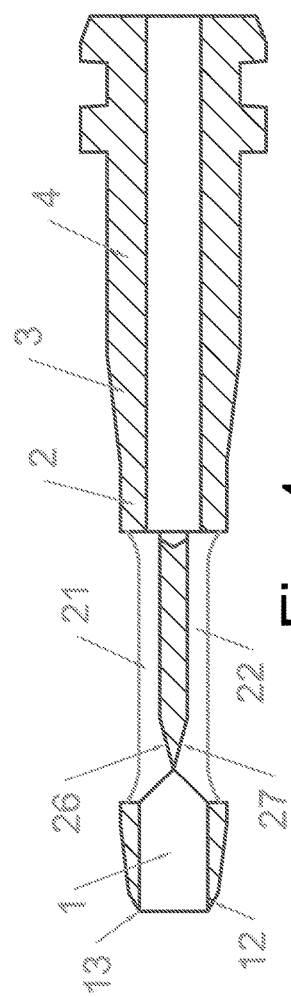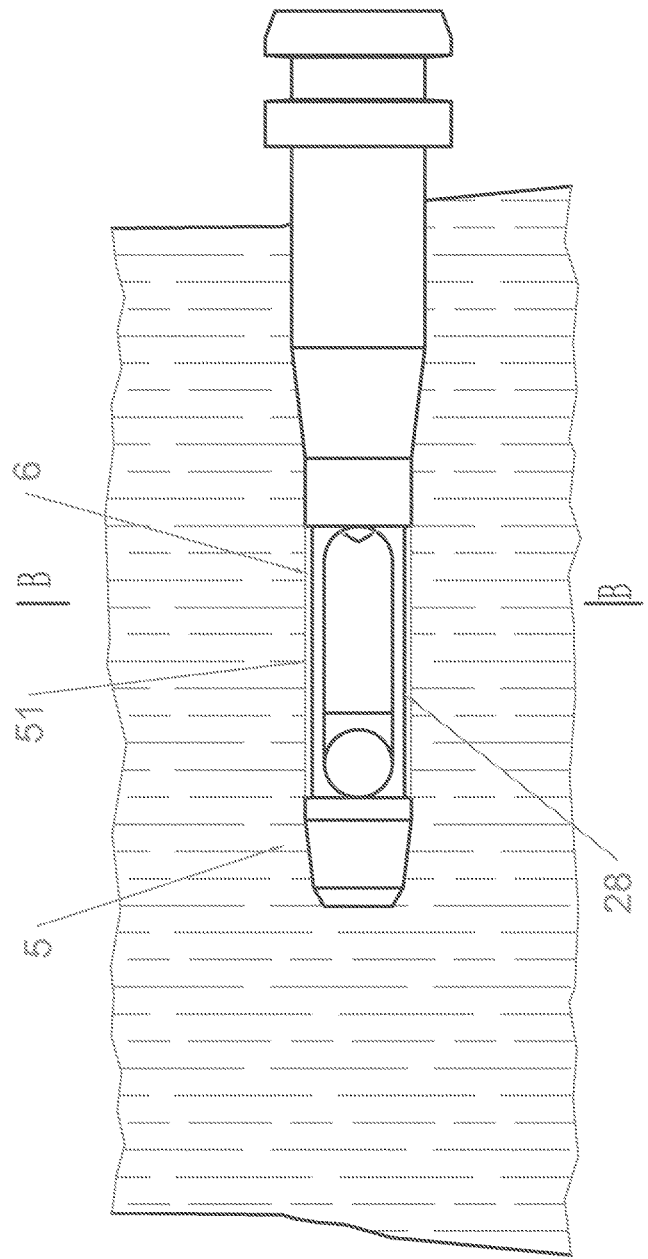

TRUNK INJECTION NEEDLE

CROSS REFERENCE OF RELATED APPLICATION

This is a U.S. National Stage under 35 U.S.C 371 of the International Application PCT/CN2015/083621, filed Jul. 8, 2015, which claims priority under 35 U.S.C. 119(a-d) to CN 2014102236786, filed May 23, 2014.

BACKGROUND OF THE PRESENT INVENTION

Field of Invention

The present invention relates to a needle used during tree injecting administration.

Description of Related Arts

China lacks forest resources. Due to long-term excessive logging, available forest resources, which are already limited, are drastically reduced. In recent decades, with deteriorating environment and rapid growth of forest pests, trees suffer from wide spread infestation, leading to a low survival rate. Forestry pests, such as stem borer, Gidding insects, *Anoplophora nobilis, Shecia siningensis* Hsu, and sucking pests with wax protective shells, are rapidly spread.

Conventional spray methods for controlling pests have the following problems: during spraying, pesticides are not effectively attached to trees which should be sprayed, thus being impossible to kill pests; a large number of pesticides are spilled on the ground or drift with wind, and are affected by environmental factors such as weather, which lowers the utilization rate of pesticides and causes environment pollution. Because of the above reasons, conventional spray methods have been difficult to efficiently control pests, and damages caused by pests are increasing day by day.

Tree injecting administration is one of the effective methods for controlling tree pests, which inputs nutrients, growth regulators, pesticides or other substances in to the tree body, and transports to each part of the tree by transpiration, so as to achieve objects such as controlling pests, increasing nutrients, curing deficiency disease, and regulating growth. Trunk injecting administration has advantages such as effective pest control and little environment pollution.

An equipment for injecting administration of trees is a trunk injector, and a key thereof is needle design. Needle performance will directly affect performance of liquid injected into the trunk.

SUMMARY OF THE PRESENT INVENTION

An object of the present invention is to provide trunk injection needle which has a small resistance when moving into or out of the trunk, is difficult to be bent or broken, and will not burst the trunk.

Accordingly, the present invention provides a trunk injection needle, comprising: a front part which is conical, a middle part which is cylindrical, and a rear part which is cylindrical, which are respectively provided along a needle axis; wherein an outer diameter of the rear part is larger than outer diameters of the front part and the middle part; the front part has a bits guiding hole extending along the needle axis, and the rear part has a drug feeding hole extending along the needle axis; wherein the middle part has two outlet holes extending along a radical direction, and a separating board is provided between the two outlet holes; a rear end of the bits guiding hole communicates with the two outlet holes at two sides of the separating board; and a front end of the drug feeding hole communicates with the two outlet holes.

Beneficial effects of the present invention are: the needle is pressed into the trunk by an external force, wherein the front end of the conical front part cuts wood fibers; and after cutting, the wood fibers form a wood core and are left in the bits guiding hole. When the needle is further inserted until the wood core contacts with the separating board, the wood core is split into two parts by the separating board and respectively enters the two outlet holes at the two sides of the separating board, so as to be pressed out through the two outlet holes. When the needle is further inserted until the rear part with the larger outer diameter enters the trunk, the rear part closely contacts with a round hole which is cut by the conical front part and pressed by the needle, so as to form a seal. Then drug liquid is injected into the two outlet holes through the drug feeding hole, and enters the trunk through the two outlet holes, wherein the drug liquid will be longitudinally transported following tree water movements, while laterally diffused during transportation. The drug liquid is transported, diffused, stored and metabolized from a root to top leaves, while some of the drug liquid is also transported to the root through phloem sieve with a downstream, or directly transferred, transported, diffused, stored and metabolized from xylem to phloem. Trunk injecting administration takes advantages of the tree material transportation and diffusion ability, so as to achieve uniform distribution of the drug liquid in the tree, and thus achieving objects such as controlling pests, curing deficiency disease, and regulating growth. Because the rear part of the needle seals the round hole, the drug liquid will not leak between the rear part and the round hole. When the needle enters the trunk, the separating board presses out wood bits in the two outlet holes along the radical direction of the needle. Therefore, at a position where the two outlet holes contact with the drug feeding hole, the wood bits are less or looser, which is more suitable for inputting the drug liquid into the trunk, and reduces a resistance for inputting the drug liquid into the trunk. Due to the separating board of the needle, the wood core is cut into two parts for reducing a resistance when the needle enters the trunk. The needle has the two outlet holes at the two sides of the separating board. When the needle enters the trunk, the wood core and the wood bits respectively generate two forces with almost identical values at the two outlet holes. That is to say, forces at two sides of the needle are almost identical, in such a manner that both sides bears, which prevents the needle from being difficult to be inserted due to a large friction at one side of the needle, and prevents the needle from being bent or even broken due to the force at one side of the needle. Meanwhile, because the forces between the trunk and the needle are mutual, a force at a needle side will not be large according to the present invention, which also prevents the trunk from being broken with a large force applied on the trunk by the needle.

After injection, the drug liquid flows into the trunk through the two outlet holes. The needle is pulled back by an external force until the needle is fully withdrawn from the trunk, which ends an injection process. During withdrawing, forces at two sides of the needle are basically the same and will not be larger at one side, in such a manner that withdrawing from the trunk is easier, and it is not easy to bend or break the needle.

According to the above trunk injection needle, a blade part is provided at a front end of the separating board, which has a cutting edge; from the cutting edge backwards alone the needle axis, a radical thickness of the blade part increases. The sharp cutting edge is easier to cut the wood core, so as to reduce a needle forward resistance. Preferably, the cutting edge extends along a needle radical direction; and the blade part, the separating board and the two outlet holes are symmetrical according to the cutting edge, in such a manner that the forces applied on the needle are symmetrical according the needle axis, the needle forward resistance is smaller, and the needle is less likely to be bent or broken.

According to the above trunk injection needle, the outer diameter of the middle part, which has the two outlet holes, is smaller than a max outer diameter of the front part. As a result, after the round hole is pressed by a periphery of the conical front part, a size thereof is larger than the outer diameter of the middle part of the needle where the two outlet holes are located, and an annular gap is formed between a periphery the middle part of the needle with the two outlet holes and the round hole on the trunk. Therefore, the drug liquid from the two outlet holes enters the annular gap for fully contacting with the trunk along a circumference, which ensures that the drug liquid enters each part of the trunk more thoroughly for improving a drug liquid absorbing rate of the trunk.

According to the above trunk injection needle, a cone transition part is provided between the middle part and the rear part. The cone transition part reduces the resistance when the needle enters the trunk, and increases a sealing performance between the needle and the round hole.

According to the above trunk injection needle, a cone cutting part is provided at a front end of the front part, an angle between a generating line of the cone cutting part and the needle axis is 25-35 degrees, and a loop blade is formed at an intersection of the cone cutting part and a wall of the bits guiding hole. Therefore, the sharp loop blade more easily cuts the wood fibers (instead of inserting the needle into the trunk by pressing). Meanwhile, the angle between the generating line of the cone cutting part and the needle axis, which is 25-35 degrees, ensures strength of the cone cutting part.

According to the above trunk injection needle, an angle a between a generating line of the front part being conical and the needle axis is 13-15 degrees; conical degrees of the cone transition part and the front part being conical are identical; and an angle b between two side faces of the blade part is 28-32 degrees. The certain conical front part, the cone transition part and the blade part provide certain strength of the needle, so as to prevent the needle from being bent or broken, while decrease the needle forward resistance.

According to the above trunk injection needle, the two outlet holes are slotted holes, whose widths equal to a diameter of the bits guiding hole. The slotted holes are easier to be machined.

According to the above trunk injection needle, a periphery of the rear part has an annular slot for containing an O-ring. After placing the O-ring in the annular slot, the needle and a drug liquid injection unit are sealing-contacted, so as to be conducive to utilization.

BRIEF DESCRIPTION OF THE DRAWINGS

FIG. 4 is a sketch view according to a preferred embodiment 2 of the present invention.
FIG. 5 is a sketch view according to a preferred embodiment 2 of the present invention when entering a trunk.

DETAILED DESCRIPTION OF THE PREFERRED EMBODIMENT

Preferred Embodiment 1

Figure 1:
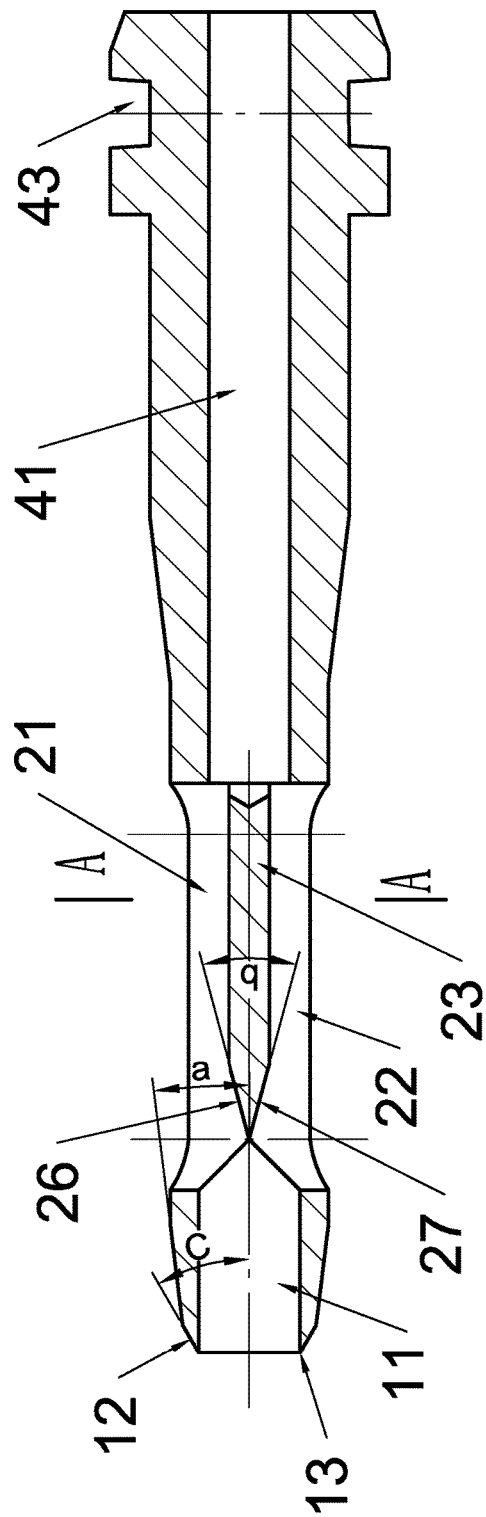
FIG. 1 is a sketch view according to a preferred embodiment 1 of the present invention.
Figure 2:
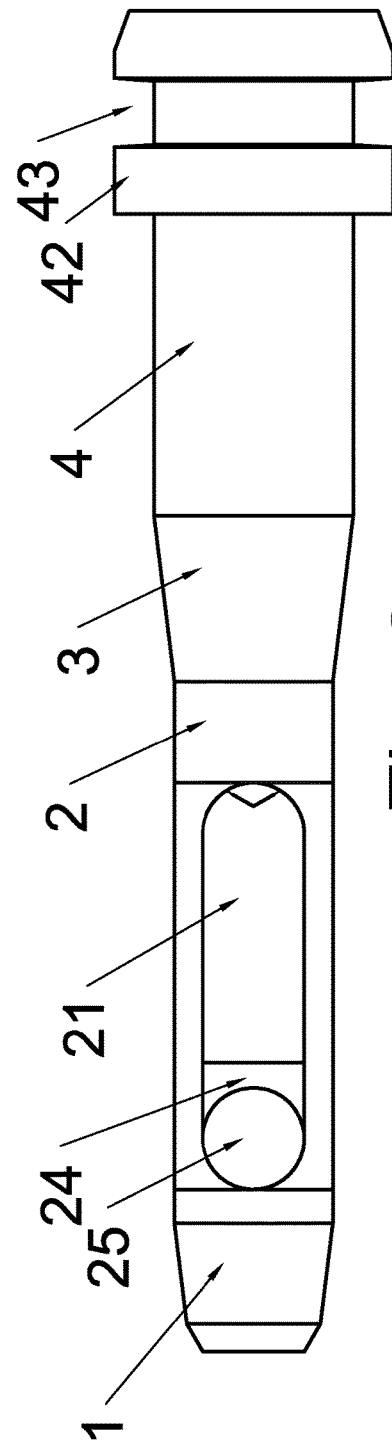
FIG. 2 is a top view of FIG. 1.
Figure 3:
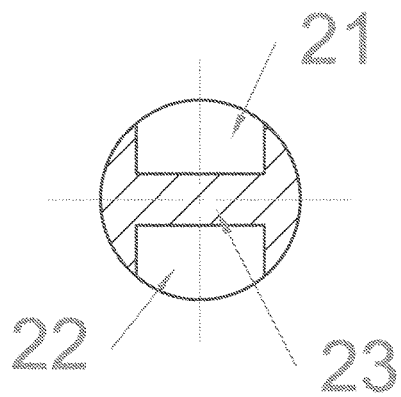
FIG. 3 is an A-A sectional view of FIG. 1.

Referring to FIGS. 1-3, a trunk injection needle is provided, comprising: a front part 1 which is conical, a middle part 2 which is cylindrical, a cone transition part 3 and a rear part 4 which is cylindrical, which are respectively provided along a needle axis. A max outer diameter of the front part 1 which is conical equals to an outer diameter of the middle part 2 which is cylindrical. An outer diameter of the rear part 4 is larger than the outer diameter of the middle part 2 which is cylindrical, and the cone transition part 3 is provided between the middle part 2 which is cylindrical and the rear part 4 which is cylindrical.

The front part 1 has a bits guiding hole 11 extending along the needle axis, and the cone transition part 3 and the rear part 4 have a drug feeding hole 41 extending along the needle axis.

The middle part has two outlet holes 21 and 22 which are slotted and extend along a radical direction, and widths of the two outlet holes 21 and 22, which are slotted, equal to a diameter of the bits guiding hole 11.

A separating board 23 is provided between the two outlet holes 21 and 22, a blade part 24 is provided at a front end of the separating board 23, which has a cutting edge 25. The cutting edge 25 extends along a needle radical direction. The blade part 24, the separating board 23 and the two outlet holes 21 and 22 are symmetrical according to the cutting edge 25.

From the cutting edge 25 backwards alone the needle axis, a distance between two side faces 26 and 27 increases (which means a radical thickness of the blade part 24 increases). An angle b between the two side faces 26 and 27 of the blade part 24 is 30 degrees.

A rear end of the bits guiding hole 11 communicates with the two outlet holes 21 and 22 at two sides of the separating board 23; and a front end of the drug feeding hole 41 communicates with the two outlet holes 21 and 22.

An angle a between a generating line of the front part 1 being conical and the needle axis is 14 degrees; a cone cutting part 12 is provided at a front end of the front part 1 which is conical, an angle c between a generating line of the cone cutting part 12 and the needle axis is 30 degrees, and a loop blade 13 is formed at an intersection of the cone cutting part 12 and a wall of the bits guiding hole 11.

Conical degrees of the cone transition part and the front part being conical are identical.

A convex loop 42 is provided at a periphery of the rear part 4 which is cylindrical, which has an annular slot 43 for containing an O-ring. A cross section of the annular slot 43 is a trapezoid which is wider outside and narrower inside.

Preferred Embodiment 2

Figure 6:
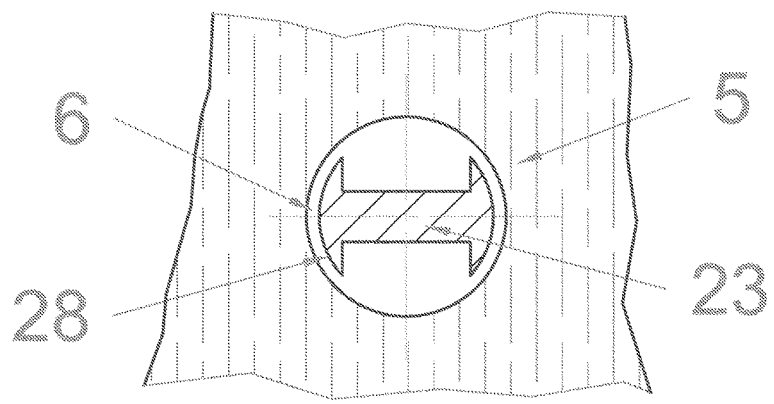
FIG. 6 is a B-B sectional view of FIG. 5.

Referring to FIGS. 4-6, a trunk injection needle is provided. Differences between the preferred embodiment 1 and the preferred embodiment 2 are as follows. An outer diameter at a position 28 of the middle part 2, which has the two outlet slots 21 and 22, is smaller than outer diameters at other positions of the middle part 2, and also smaller than the max outer diameter of the front part 1 of the needle. Therefore, after a round hole 51 is pressed by a periphery of the front part 1 being conical, a size thereof is larger than the outer diameter of position 28 of the middle part 2 of the needle where the two outlet holes 21 and 22 are located, and an annular gap 6 is formed between a periphery the middle part 2 of the needle with the two outlet holes 21 and 22 and the round hole 51 on the trunk. Other structures of the preferred embodiment 2 are identical to that of the preferred embodiment 1.

According to the preferred embodiments 1 and 2, a needle structure is a hollow cylinder, wherein the front part 1 of the needle is the loop blade 13, side faces of a middle-front part has the two outlet holes 21 and 22 for outputting drugs and bits, a middle rear structure is a cylindrical sealing part, the cone transition part 3 forms a secondary sealing cylindrical face with a part of the rear part 4 with a larger diameter, and an O-ring sealing annular slot is provided at a part where the rear part 5 is connected to a needle holder. The loop blade 13 at a front face cuts wood fibers; and after cutting, the wood fibers form a wood core and are left in the bits guiding hole (which will be pushed out by new wood core during next injection). When the needle is further inserted until the wood core contacts with the separating board 23, the wood core is split into two parts by the separating board 23 and respectively enters the two outlet holes 21 and 22 at the two sides of the separating board 23, so as to be pressed out through the two outlet holes 21 and 23. When the needle is further inserted until the cone transition part 3 with the larger outer diameter enters the trunk, the cone transition part 3 closely contacts with the round hole 51 which is cut by the front part 1 which is conical and pressed by the needle, so as to form a seal. Then pressing is stopped, and injection begins, wherein drug liquid enters the trunk through the two outlet holes 21 and 22, and the drug feeding hole 41. After injection, the needle is pulled back by an external force until the needle is fully withdrawn from the trunk, which ends an injection process. Because inserting such needle is pressing the trunk by an outer surface of the needle and a pressing amount is a wall thickness of the needle. As a result, the pressing amount is greatly reduced, and the wood fibers are difficult to be burst, in such a manner that a sealing effect is ensured, pesticide consumption is reduced, and an injection effect is sufficient.

The needle is reasonable designed to reduce friction between the needle and wood during inserting. Therefore, not only the needle is easy to be inserted, but also the needle and the tree are not damaged. Furthermore, strength and stiffness properties of the needle are sufficient, and the needle is difficult to be bent and broken during inserting. The present invention discloses a needle with automatically outputted bits as well as convenient inserting and withdrawing. The needle is simple in structure, easy to process, economical and durable.

What is claimed is:

1. A trunk injection needle, comprising: a front part which is conical, a middle part which is cylindrical, and a rear part which is cylindrical, which are respectively provided along a needle axis; wherein an outer diameter of the rear part is larger than outer diameters of the front part and the middle part; the front part has a bits guiding hole extending along the needle axis, and the rear part has a drug feeding hole extending along the needle axis; wherein the middle part has two outlet holes extending along a radial direction, and a separating board is provided between the two outlet holes; a rear end of the bits guiding hole communicates with the two outlet holes at two sides of the separating board; and a front end of the drug feeding hole communicates with the two outlet holes;
   wherein a blade part is provided at a front end of the separating board, which has a cutting edge; from the cutting edge backwards along the needle axis, a radial thickness of the blade part increases.

2. The trunk injection needle, as recited in claim 1, wherein the cutting edge extends along a needle radial direction; the blade part, the separating board and the two outlet holes are symmetrical according to the cutting edge.

3. The trunk injection needle, as recited in claim 2, wherein the outer diameter of the middle part, which has the two outlet holes, is smaller than a max outer diameter of the front part.

4. The trunk injection needle, as recited in claim 2, wherein a cone transition part is provided between the middle part and the rear part.

5. The trunk injection needle, as recited in claim 4, wherein a cone cutting part is provided at a front end of the front part, an angle between a generating line of the cone cutting part and the needle axis is 25-35 degrees, and a loop blade is formed at an intersection of the cone cutting part and a wall of the bits guiding hole.

6. The trunk injection needle, as recited in claim 5, wherein an angle between the generating line of the front part being conical and the needle axis is 13-15 degrees; conical degrees of the cone transition part and the front part being conical are identical; and an angle b between two side faces of the blade part is 28-32 degrees.

7. The trunk injection needle, as recited in claim 6, wherein the two outlet holes are slotted holes, whose widths are equal to a diameter of the bits guiding hole.

8. The trunk injection needle, as recited in claim 2, wherein a periphery of the rear part has an annular slot for containing an O-ring.

9. The trunk injection needle, as recited in claim 1, wherein the outer diameter of the middle part, which has the two outlet holes, is smaller than a max outer diameter of the front part.

10. The trunk injection needle, as recited in claim 1, wherein a cone transition part is provided between the middle part and the rear part.

11. The trunk injection needle, as recited in claim 10, wherein a cone cutting part is provided at a front end of the front part, an angle between a generating line of the cone cutting part and the needle axis is 25-35 degrees, and a loop blade is formed at an intersection of the cone cutting part and a wall of the bits guiding hole.

12. The trunk injection needle, as recited in claim 11, wherein an angle between the generating line of the front part being conical and the needle axis is 13-15 degrees; conical degrees of the cone transition part and the front part being conical are identical; and an angle b between two side faces of the blade part is 28-32 degrees.

13. The trunk injection needle, as recited in claim 12, wherein the two outlet holes are slotted holes, whose widths are equal to a diameter of the bits guiding hole.

14. The trunk injection needle, as recited in claim 1, wherein a periphery of the rear part has an annular slot for containing an O-ring.

* * * * *